United States Patent
Ney et al.

[11] Patent Number: 5,897,041
[45] Date of Patent: Apr. 27, 1999

[54] APPARATUS FOR SUPPORTING A BEVERAGE CONTAINER

[75] Inventors: Clyde W. Ney, Clarkston; James L. Hackstedde, Bloomfield Hills; Stephen W. Singer, Auburn Hills, all of Mich.

[73] Assignee: DaimlerChrysler Corporation, Auburn Hills, Mich.

[21] Appl. No.: 08/996,572

[22] Filed: Dec. 23, 1997

[51] Int. Cl.$^6$ .............................. B60R 7/06; A47K 1/09
[52] U.S. Cl. .................... 224/483; 224/926; 248/311.2
[58] Field of Search ................... 224/483, 544, 224/545, 555, 556, 558, 566, 548, 565, 567, 572; 220/737, 738, 742, 23.87; 248/311.2, 313

[56] References Cited

U.S. PATENT DOCUMENTS

| | | | |
|---|---|---|---|
| 4,927,108 | 5/1990 | Blazic et al. | 248/311.2 |
| 4,981,277 | 1/1991 | Elwell | 248/311.2 |
| 5,024,411 | 6/1991 | Elwell | 248/311.2 |
| 5,052,649 | 10/1991 | Hunnicutt | 248/311.2 |
| 5,088,673 | 2/1992 | Chandler | 248/311.2 |
| 5,234,251 | 8/1993 | Ayotte | 297/188.14 |
| 5,289,962 | 3/1994 | Tull et al. | 224/273 |
| 5,326,064 | 7/1994 | Sapien | 248/311.2 |
| 5,494,249 | 2/1996 | Ozark et al. | 248/311.2 |
| 5,639,052 | 6/1997 | Sauve | 248/311.2 |
| 5,676,340 | 10/1997 | Ruhnau | 248/311.2 |

Primary Examiner—Allan N. Shoap
Assistant Examiner—Maerena W. Brevard
Attorney, Agent, or Firm—Mark P. Calcaterra

[57] ABSTRACT

An apparatus for supporting a beverage container within an existing generally cylindrical recess in a motor vehicle. The apparatus includes a generally cylindrical sidewall having an upper and lower portion. Each portion defines a cylindrical recess for receiving varying sizes of beverage containers. A radial flange interconnects the upper and lower portions, and further provides a surface upon which to support a beverage container. Retaining devices extend from the radial flange and secure the apparatus in the existing recess in the motor vehicle. The apparatus further includes a slot to allow a mug handle to extend therethrough and a pressure relief aperture in its base.

14 Claims, 2 Drawing Sheets

APPARATUS FOR SUPPORTING A BEVERAGE CONTAINER

BACKGROUND OF THE INVENTION

1. Field of the Invention

The present invention relates to an apparatus for supporting a beverage container. More particularly, the present invention relates to an apparatus which may be inserted into an existing recess provided in a console of a vehicle for supporting beverage containers of various sizes.

2. Discussion

Beverage containers are available in a wide range of sizes and are often transported in compartments of vehicles for the convenience of the occupants. By the nature of their generally upright and cylindrical constructions, beverage containers are not sufficiently stable to functionally withstand the jostling encountered during normal motor vehicle travel unless physically held or otherwise appropriately secured. Because it is often desirable to set aside a beverage container during the course of a trip, the containers are often placed on the floor or other surface where they are likely to be upset.

Currently, many automotive vehicle manufactures provide the interior of each vehicle with one or more devices for supporting a beverage container. The devices provide a place to secure a beverage container during vehicle operation. Typically, the devices are either stationary platforms mounted horizontally with respect to the vehicle in open view, or they are retractable or hidden from view and pulled out when needed. Previously, cup holders have been coupled with ashtrays, glove compartment doors, or simply formed as a cylindrical cavity in a vehicle console.

Cylindrical cavities formed in a vehicle console for supporting a beverage container are advantageous in that they are easily manufactured and relatively inexpensive. However, one problem with such an arrangement for supporting beverage containers is the inability to readily secure beverage containers of varying sizes. Thus, a need in the relevant art exists to adapt an existing cylindrical cavity provided in the vehicle console to accommodate beverage containers of various dimensions.

It is therefore a primary object of the present invention to provide an apparatus for supporting a beverage container which is capable of securing variously sized beverage containers within a cylindrical cavity provided in a vehicle console.

It is a related object of the present invention to provide an apparatus for supporting a beverage container which is capable of securing containers having handles in cylindrical cavities provided in a vehicle console.

It is a more specific object of the present invention to provide an insert for an existing cylindrical cavity in a vehicle console which functions to securely retain beverage containers of first and second diameters, and can be readily removed such that the cylindrical recesses can normally accommodate a beverage container having a diameter intermediate to the first and second dimensions.

In general, the present invention provides an apparatus for supporting a beverage container in a generally cylindrical recess provided in a motor vehicle. The apparatus includes a generally cylindrical sidewall, having an upper portion and a lower portion. The upper portion defines a diameter that is greater than a diameter defined by the lower portion. The upper and lower portions are interconnected by a radial flange portion.

In a more preferred form, the present invention also provides a vertically extending slot along the upper edge of the apparatus which serves to receive a mug handle. Furthermore, in a more preferred form, the apparatus includes retaining portions extending from the radial flange to secure the apparatus in the vehicle's existing generally cylindrical recess. Lastly, the preferred apparatus of the present invention also includes a pressure relief aperture extending through the base.

Further advantages of the present invention will become apparent from the detailed description provided hereinafter. It should be understood however that the detailed description and specific example, while indicating a preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
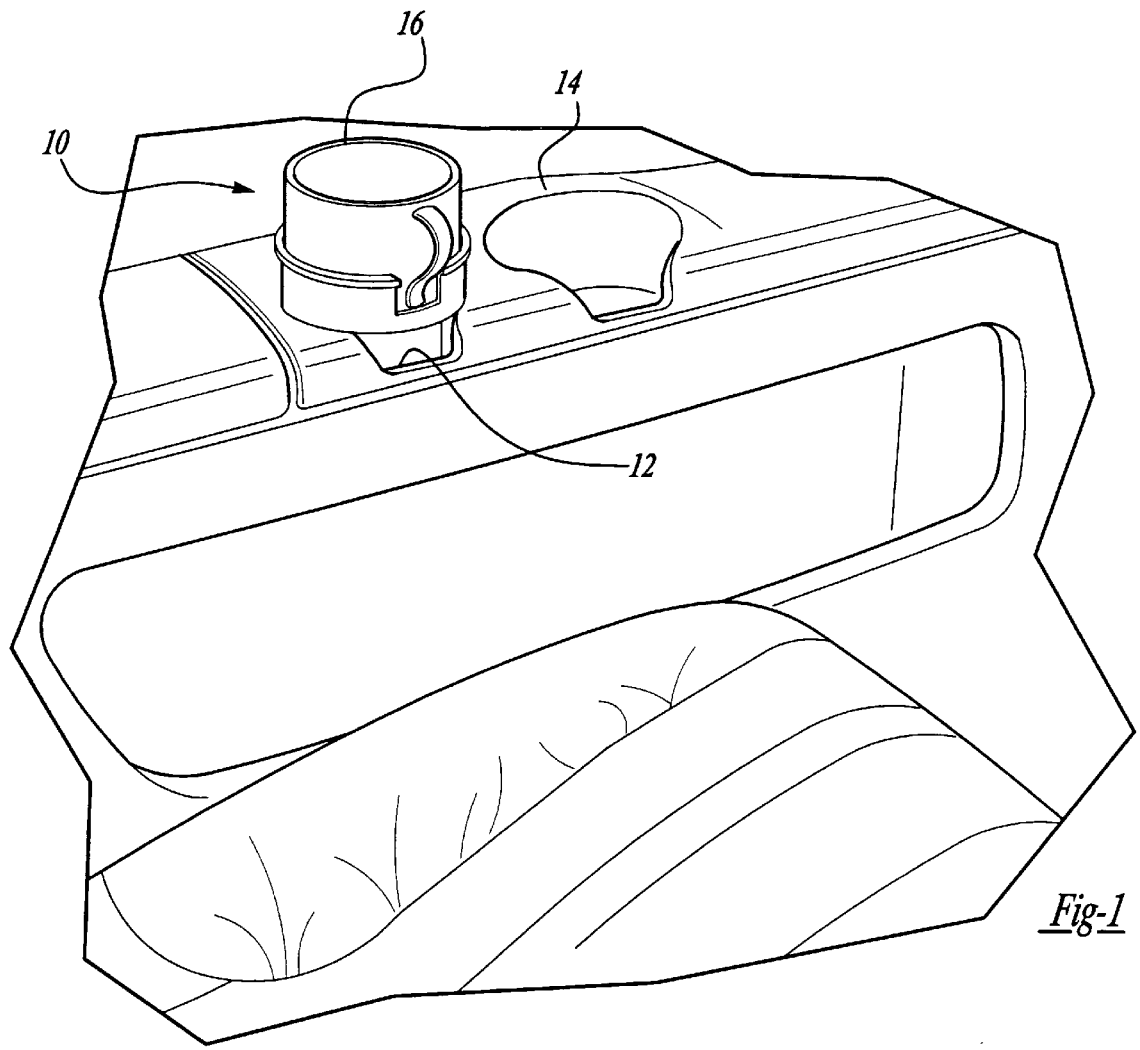
FIG. 1 is an environmental view of an apparatus for supporting a beverage container constructed in accordance with the teachings of the preferred embodiment of the present invention shown operatively associated with a cylindrical aperture provided in a motor vehicle console and securely receiving a coffee mug.

Referring first to FIG. 1, an apparatus 10 constructed in accordance with a preferred embodiment of the present invention is illustrated operatively associated with a generally cylindrical recess 12 provided in a console 14 of a motor vehicle. A beverage container illustrated as a coffee mug 16 is shown securely received within the apparatus 10. The generally cylindrical recess 12 conventionally functions to securely receive a beverage container having a diameter slightly less than the diameter of the recess 12. As will become apparent below, the apparatus 10 of the present invention functions to adapt the recesses to accommodate beverage containers having varying dimensions. More particularly, the apparatus 10 functions to accommodate beverage containers having diameters larger than and smaller than the standard size intended for the recess 12. It will be understood by those skilled in the art that the apparatus 10 can be used with a variety of recesses and that the illustrated use is merely exemplary.

Figure 2:
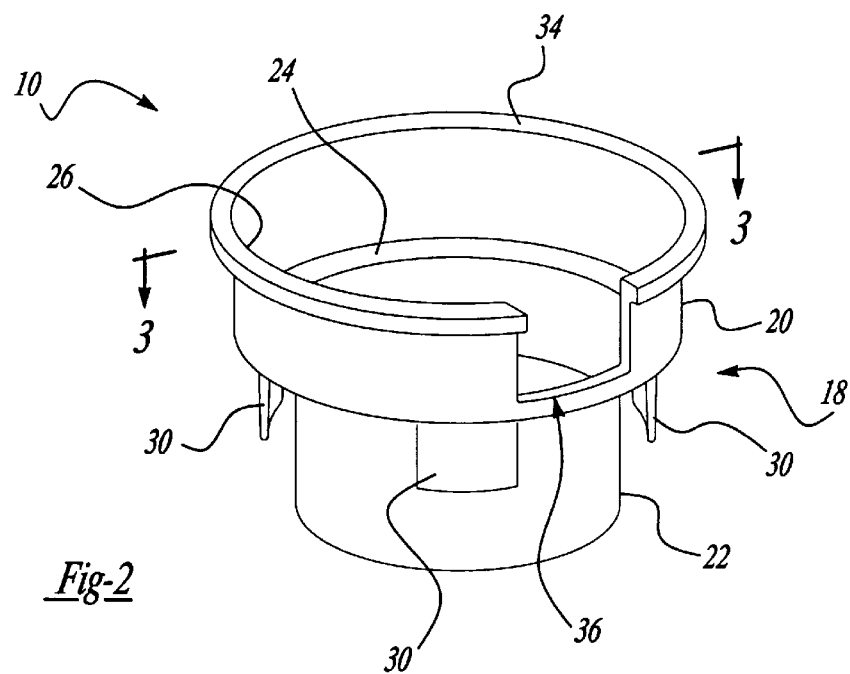
FIG. 2 is a top perspective view of the apparatus for supporting a beverage container of the present invention.
Figure 3:
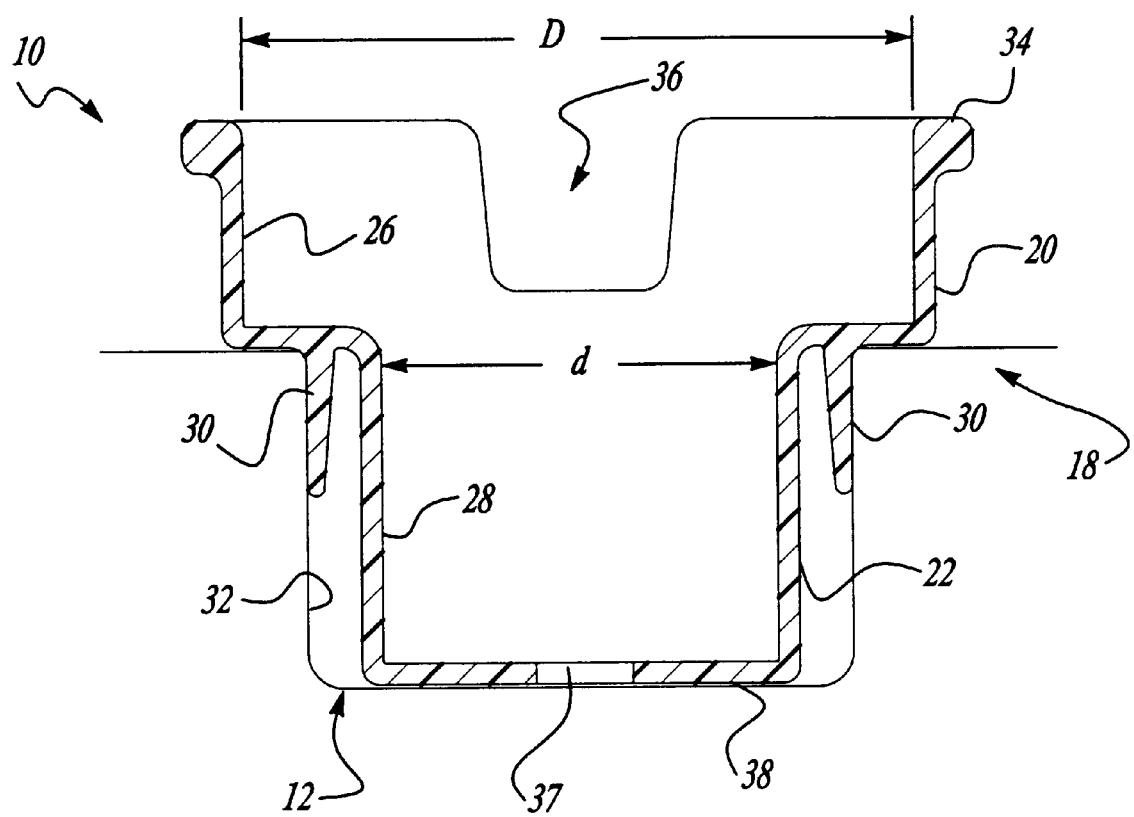
FIG. 3 is a cross-sectional view taken along line 3—3 of FIG. 2.

With continued reference to FIG. 1 and additional reference to FIGS. 2 and 3, apparatus 10 is shown to include a generally cylindrical sidewall 18 having an upper portion 20 and a lower portion 22. A radial flange 24 interconnects upper portion 20 to lower portion 22.

Upper portion 20 defines a first generally cylindrical recess 26 having an internal diameter D capable of receiving a beverage container therein. In the exemplary embodiment illustrated, the internal diameter D downwardly tapers from a maximum value to a minimum value. Lower portion 22 defines a second generally cylindrical recess 28 having a reduced diameter similarly capable of receiving a beverage container. Again, internal diameter d downwardly tapers from a maximum value to a minimum value.

To provide means for removably securing apparatus 10 to existing cylindrical recess 12 in the motor vehicle, apparatus 10 further includes a plurality of retaining members 30. Retaining members 30 extend downward from radial flange 24 and are biased against a wall 32 of recess 12. Without intending to be limiting by example, four retaining members 30 have been found to adequately secure apparatus 10 in recess 12. However, it will be apparent to one skilled in the art that any number of retaining members 30 may be used to secure apparatus 10.

Apparatus 10 also includes an upper edge 34 and a vertically extending slot 36. Upper edge 34 extends along upper portion 20 to allow for easy insertion and removal of apparatus 10 from recess 12. Vertically extending slot 36 allows for a handle of mug 16 to extend therethrough (as shown in FIG. 1). While not illustrated, a plurality of vertically extending slots 36 may be included in apparatus 10 to allow for various orientations of a mug without requiring apparatus 10 to be repositioned in recess 12.

Apparatus 10 further includes an aperture 37 disposed in base 38 of lower portion 22. Aperture 37 allows pressure created between a beverage container (not shown) and apparatus 10 to be relieved. As a result, force required to insert or remove a beverage container is minimized.

In the preferred embodiment, apparatus 10 is unitarily constructed of plastic. However, it will be appreciated that any material providing favorable characteristics, such as durability and resilience, may be incorporated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for supporting a beverage container within a motor vehicle, the motor vehicle including a console having a generally cylindrical recess, the apparatus comprising:

a generally cylindrical sidewall having an upper portion and a lower portion;

said upper portion having a first internal diameter;

said lower portion having a second internal diameter, said second internal diameter being less than said first internal diameter;

at least one retaining member for removably securing the apparatus to the generally cylindrical recess in the console, said at least one retaining member downwardly extending from an exterior surface of said radial flange portion, said retaining member adapted to be resiliently deflected upon introduction of the apparatus into the generally cylindrical recess of the console;

a radial flange portion interconnecting said upper portion and said lower portion; and the apparatus being removably insertable into the generally cylindrical recess.

2. The apparatus according to claim 1, wherein the upper portion includes an upper edge and a vertically extending slot opened at said upper edge.

3. The apparatus according to claim 1, further comprising a base having a pressure relief aperture.

4. The apparatus according to claim 1, wherein the apparatus is unitarily constructed of plastic.

5. An apparatus for securely retaining a beverage container within a motor vehicle, the motor vehicle including a console having a generally cylindrical recess with an internal diameter, the apparatus comprising:

a generally cylindrical sidewall having an upper portion and a lower portion;

said upper portion having an first internal diameter;

said lower portion having a second internal diameter, said second internal diameter being less than said first internal diameter;

a radial flange portion interconnecting said upper portion and said lower portion; and at least one retaining member for removably securing the apparatus to the generally cylindrical recess in the console, said at least one retaining member downwardly extending from said radial flange portion, said at least one retaining member adapted to resiliently deflect upon insertion of the apparatus within the generally cylindrical recess of the console;

the apparatus being removably insertable into the generally cylindrical recess.

6. The apparatus according to claim 5, wherein said first internal diameter of said upper portion is larger than the internal diameter of the generally cylindrical recess in the console and said second internal diameter of said lower portion is smaller than the internal diameter of the generally cylindrical recess in the console.

7. The apparatus according to claim 5, further comprising a slot disposed in said upper portion.

8. The apparatus according to claim 5, further comprising a base having a pressure relief aperture.

9. The apparatus according to claim 5, wherein the apparatus is unitarily constructed of plastic.

10. An arrangement for selectively supporting one of a generally cylindrical beverage container and a coffee mug with a handle within a vehicle, the arrangement comprising:

a console having a generally cylindrical recess with an internal diameter; and an apparatus removably insertable into said generally cylindrical recess, said apparatus including:

a generally cylindrical sidewall having an upper portion and a lower portion;

said upper portion having an internal diameter greater than the internal diameter of said lower portion;

a radial flange portion interconnecting said upper portion and said lower portion; and at least one retaining member for removably securing the apparatus to said generally cylindrical recess in said console, said at least one retaining member downwardly extending from said radial flange portion, said at least retaining member adapted to be resiliently deflected upon insertion of the apparatus within said generally cylindrical recess of said console.

11. The arrangement according to claim 10, wherein said internal diameter of said upper portion is larger than said internal diameter of said generally cylindrical recess in said console and said internal diameter of said lower portion is smaller than said generally cylindrical recess in said console.

12. The arrangement according to claim 10, further comprising a slot disposed in said upper portion adapted to receive the handle of the coffee cup.

13. The arrangement according to claim 10, further comprising a base having a pressure relief aperture.

14. The arrangement according to claim 10, wherein the apparatus is unitarily constructed of plastic.

* * * * *